United States Patent
Hulvey

(10) Patent No.: US 10,295,647 B1
(45) Date of Patent: May 21, 2019

(54) ASSET LOCATION USING DIRECTION FINDING FEATURES

(71) Applicant: Cypress Semiconductor Corporation, San Jose, CA (US)

(72) Inventor: Robert Hulvey, Redondo Beach, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/021,407

(22) Filed: Jun. 28, 2018

Related U.S. Application Data

(60) Provisional application No. 62/642,169, filed on Mar. 13, 2018.

(51) Int. Cl.
| | |
|---|---|
| *G01S 3/36* | (2006.01) |
| *G01S 3/32* | (2006.01) |
| *H04B 7/08* | (2006.01) |
| *H04W 4/38* | (2018.01) |
| *H04W 84/18* | (2009.01) |
| *H04W 76/14* | (2018.01) |

(52) U.S. Cl.
CPC .............. *G01S 3/36* (2013.01); *G01S 3/325* (2013.01); *H04B 7/084* (2013.01); *H04B 7/0897* (2013.01); *H04W 4/38* (2018.02); *H04W 76/14* (2018.02); *H04W 84/18* (2013.01)

(58) Field of Classification Search
CPC .......... H04W 64/00; G01S 5/02; G01S 5/021; G01S 5/06; G01S 5/14
USPC ....................................................... 342/457
See application file for complete search history.

(56) References Cited

U.S. PATENT DOCUMENTS

| | | | |
|---|---|---|---|
| 6,735,444 B2 | 5/2004 | Wingren | |
| 7,800,541 B2 | 9/2010 | Moshfeghi | |
| 9,733,334 B2 | 8/2017 | Olmedo et al. | |
| 9,807,567 B1 | 10/2017 | Martin et al. | |
| 9,814,051 B1 | 11/2017 | Shpak | |
| 2007/0197229 A1 | 8/2007 | Kalliola et al. | |
| 2012/0315919 A1 | 12/2012 | Hirsch | |

(Continued)

FOREIGN PATENT DOCUMENTS

TW  201739216 A  11/2017

OTHER PUBLICATIONS

F.Cheraghi, "A Bluetooth-Based Indoor LBS System" Dept. of Surveying and Geomattics Eng. 4 pages.

(Continued)

*Primary Examiner* — Harry K Liu

(57) ABSTRACT

Systems, methods, and devices are disclosed for enabling a mobile device with limited RF capability to obtain accurate directions for finding an object or asset via a multiple-antenna locator device. The mobile device generates a request to the locator device to obtain directions to find the asset. A request can also be made to obtain the mobile device's own location from the multiple-antenna locator device which has an antenna array and is in a fixed location that has good RF visibility. The locator device identifies the target asset and receives an RF signal from it using the antenna array. The signal is detected at each antenna and phase samples are recorded. The phase sample data is used in angle-related functions, such as angle of arrival and angle of departure algorithms to calculate the direction of the asset.

18 Claims, 7 Drawing Sheets

(56) References Cited

U.S. PATENT DOCUMENTS

| | | | |
|---|---|---|---|
| 2013/0188538 A1* | 7/2013 | Kainulainen | G01S 3/48 |
| | | | 370/310 |
| 2015/0245311 A1 | 8/2015 | Wang et al. | |
| 2016/0047885 A1* | 2/2016 | Wang | G01S 3/02 |
| | | | 342/442 |
| 2016/0327631 A1 | 11/2016 | Salokannel et al. | |
| 2016/0337808 A1 | 11/2016 | Narasimha | |
| 2017/0201859 A1* | 7/2017 | Banerjea | H04W 4/80 |
| 2017/0208564 A1 | 7/2017 | Lee et al. | |

OTHER PUBLICATIONS

Manikanta Kotaru, "SpotFi: Decimeter Level Localization Using Wifi" Stanford University, 14 pages.

International Search Report for International Application No. PCT/US2019/020004 dated Mar. 29, 2019, 2 pages.

Written Opinion of the International Searching Authority for International Application No. PCT/US2019/020004 dated Mar. 29, 2019, 5 pages.

\* cited by examiner

ASSET LOCATION USING DIRECTION FINDING FEATURES

CROSS-REFERENCE TO RELATED APPLICATIONS

This application claims the benefit under 35 U.S.C. § 119(e) of U.S. Provisional Patent Application 62/642,169, entitled "Enhancements for Item Location using Bluetooth Direction Finding Features," filed on Mar. 13, 2018, which is incorporated herein by reference in its entirety for all purposes.

TECHNICAL FIELD

This disclosure generally relates to mobile devices and, more specifically, to software and devices for direction finding tools for locating objects and determining distances between objects using radio frequency signals and angle-related data.

BACKGROUND

As the Internet of Things trend, commonly referred to as IoT, grows, so does the number of objects or things that can now be described as being connected. This creates an increasing inventory of a wide variety of assets that entities, whether they are families, multinational corporations, or government institutions, have to keep track of. As such, there will be a strong need for what is referred to as direction finding features on mobile devices. Put simply, there will be a need for a tool that allows people, automated processes, and other entities to physically find things, a tool that shows a "user" which direction and how far to go to find the item of interest. For example, new features in the Bluetooth specification enable direction finding features in devices. Similar features, tools, and apps are likely to evolve for other standards.

However, as is the case with Bluetooth, these features will likely require that the device being used have significant radio frequency (RF) capabilities which, in turn, may require that the device have multiple antennas for gathering specific and accurate raw angular data. For example, the direction finding feature may require that the mobile device have an antenna array in order to locate a target asset. One or two antennas may be placed at the corners of a device, such as a smartphone. However, performance of these antennas is likely to be significantly hampered by movement and blockage from a user's hand or body, and by structures around the user, all of which degrade RF visibility of the device in a given area. In addition, small and constrained form factors of many mobile devices limits antenna size and compromises control of the gain and directionality of antennas in the device.

What is needed is a system that enables a mobile device to take advantage of new direction finding tools. It would also be desirable for the system to scale so that an increasing number of devices may be used to locate similarly increasing number of objects and assets in the expanding IoT environment. Additionally, it would be desirable to shift the processing burden of executing direction finding tools off the mobile device to a more efficient and capable apparatus.

SUMMARY

Disclosed herein are methods and systems for obtaining directional data that can be used for locating a target asset. In some embodiments a mobile device is used in conjunction with a multiple-antenna locator apparatus to locate a target asset. A direction-data application or tool is initiated by a user on a mobile device or requesting device. This creates a request for directional data for finding the target asset using the mobile device. This request is transmitted to the multiple-antenna locator apparatus which calculates directional data of the target asset utilizing angle data derived from signals and tones transmitted between the target asset and the multiple-antenna locator. The mobile device receives directional data for the target asset from the multiple-antenna locator and displays the data in a manner where it can be used by the user to locate the target asset. In one embodiment, this direction finding tool is used on the mobile device, such as a smart phone, that does not have multiple antennas. In one embodiment, the mobile device estimates a location vector of the target asset by using position data of the multiple-antenna locator and the target asset directional data. In another embodiment, the multiple-antenna locator apparatus is a network, such as a mesh network, of individual multiple-antenna locator devices. An individual multiple-antenna locator device executes, or a multiple-antenna locator apparatus that is made up of multiple devices, executes host stack software that uses angle-data algorithms. In one embodiment, these calculations include angle of departure and angle of arrival tools.

In another embodiment, the directional data relating to the target asset is calculated by receiving an extended signal from the target asset at an antenna on the multiple-antenna locator apparatus. The multiple-antenna locator traverses, rotates, or flips through multiple antennas in an antenna array, each antenna receiving the extended signal. Software on the multiple-antenna locator records and stores phase information for the tone as it is received on each antenna, thereby obtaining multiple phase samples. These phase samples are used to calculate the direction from which the extended signal is emanating, thereby providing the direction of the target asset. The calculations use angle of departure and angle of arrival data, for example, available from Bluetooth applications.

In another embodiment, the mobile device estimates a location of the target asset utilizing known position data of the multiple-antenna locator apparatus and the target asset position data. The multiple-antenna locator apparatus determines a distance estimate between the multiple-antenna locator and the target asset. A distance estimate for the distance between the mobile device and the multiple-antenna locator apparatus is obtained where the multiple-antenna locator determines a distance estimate between the mobile device and the multiple-antenna locator.

In another embodiment, a method of a mobile device to obtain its own location by utilizing a multiple-antenna locator apparatus is disclosed. The mobile device transmits to the multiple-antenna locator apparatus a request for its own location. The multiple-antenna locator determines the device location using angle-specific data calculated from signals transmitted between the mobile device and the multiple-antenna locator apparatus. The mobile device receives its own location data from the multiple-antenna locator once the calculations have been performed. The multiple-antenna locator determines the location of the mobile device by receiving a specific tone from the mobile device via multiple antennas on the multiple-antenna locator apparatus. The multiple-antenna locator rotates through multiple antennas, each antenna receiving the specific signal. At each antenna, a phase sample is recorded and stored. The multiple-antenna locator calculates the location of the mobile device using the multiple phase samples and Bluetooth angle-specific calculations.

DETAILED DESCRIPTION

Figure 1:
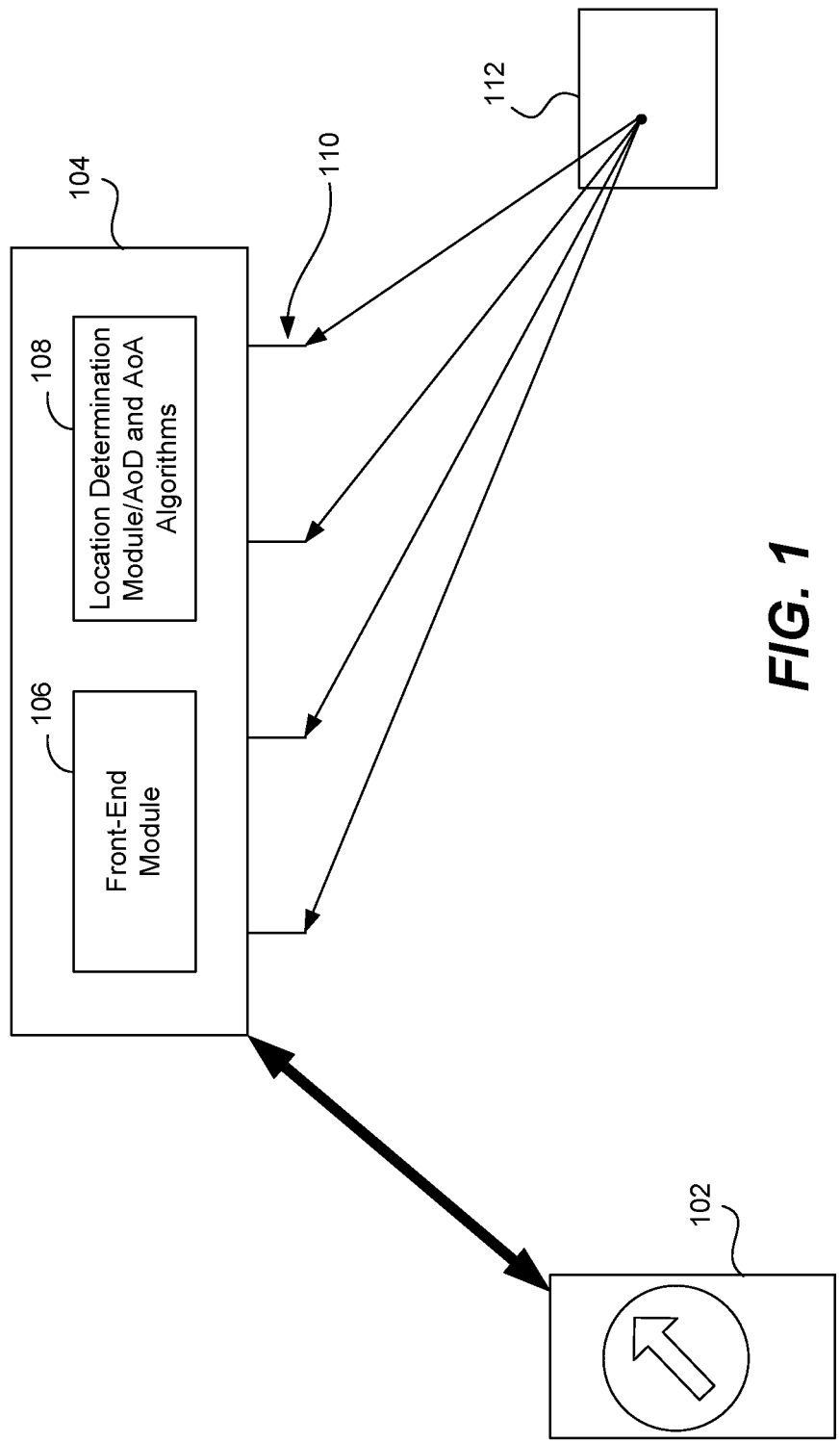
FIG. 1 is a block diagram illustrating various devices and modules for enabling direction finding and asset location on a mobile device in accordance with one embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As described above, as the Internet of Things (IoT) continues to grow with a wide spectrum of devices, wearables, sensors, monitors, meters, appliances, tags and a multitude of other connected objects and devices, it is likely that the need to physically find such things will also grow. Individuals, whether in a work environment, public space, or in their home environments, will occasionally need to be physically directed to an asset, whether it be a consumer electronic product at home or a small tag in a large warehouse. This asset may not be connected to a network, such as a Wi-Fi or Zigbee network, in the environment. For example, an individual may want to find an object or thing that is already connected to a network. This connection or connectivity link can be leveraged to also locate the object. If an object or asset is not connected to a network of any kind, the value of the asset may justify providing it with location-determination support or mechanisms. In many cases a mobile device, such as a smartphone or tablet, will be used to give directions to a user to locate the asset. The interface may be an arrow on the screen showing which way to walk to get to the asset or it may be a highlighted path on a map or floor plan.

Ongoing developments in Bluetooth and Bluetooth Low Energy (BLE) are expected to enable the collection of angle-specific data derived from a radio frequency (RF) signal or tone sent from one object to another using antennae, which in turn can be used in algorithms and processing to calculate the direction or position of one object relative to the other. Such algorithms may be referred to as location determination functions. These developments may require that one of the objects have multiple antennas or an antenna array for detecting the signal and the other, which may be referred to as the target asset to have at least one antenna for transmitting a signal or tone. However, many mobile devices are not able to contain the necessary RF and antenna capability to record sufficient angle data needed to perform the directional data calculations. Current conventional form factors of such devices and how these devices are used and held make it difficult to fully leverage the angle-data algorithms and tools for direction finding enabled by enhancements in the Bluetooth specification.

In some embodiments a mobile device with limited RF capability is able to obtain accurate directions for locating or finding a target asset by interacting with a third device. In one embodiment, the third device, referred to a multiple-antenna locator ("locator") has substantially more effective antenna and RF characteristics. In some embodiments, a mobile device may request its own location from the multiple-antenna locator. That is, the device can use the multiple-antenna locator to help locate itself in a setting or environment.

Figure 2:
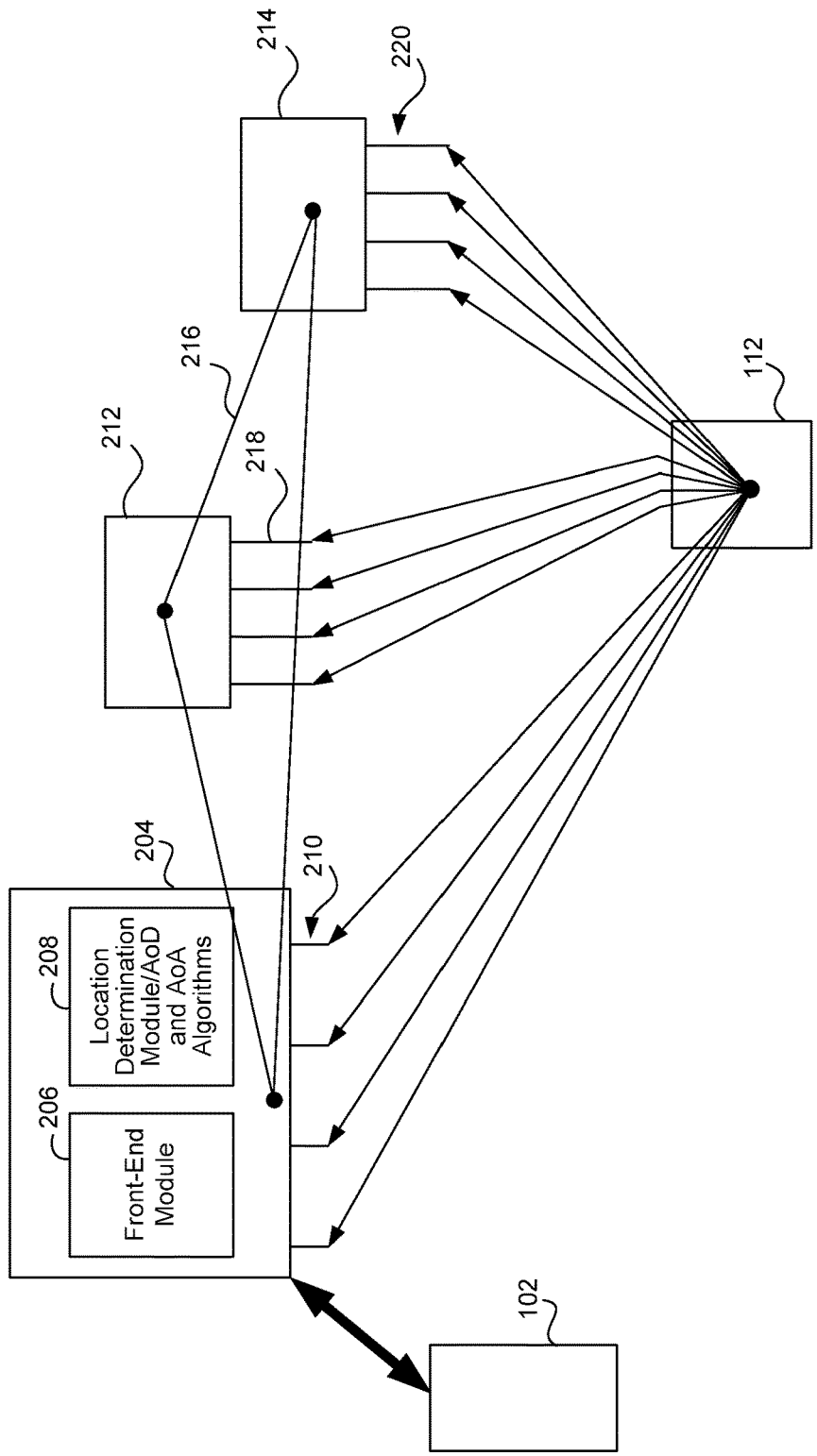
FIG. 2 is a block diagram showing another different embodiment of enabling a mobile device to obtain directions to a target asset in accordance with one embodiment.
Figure 3:
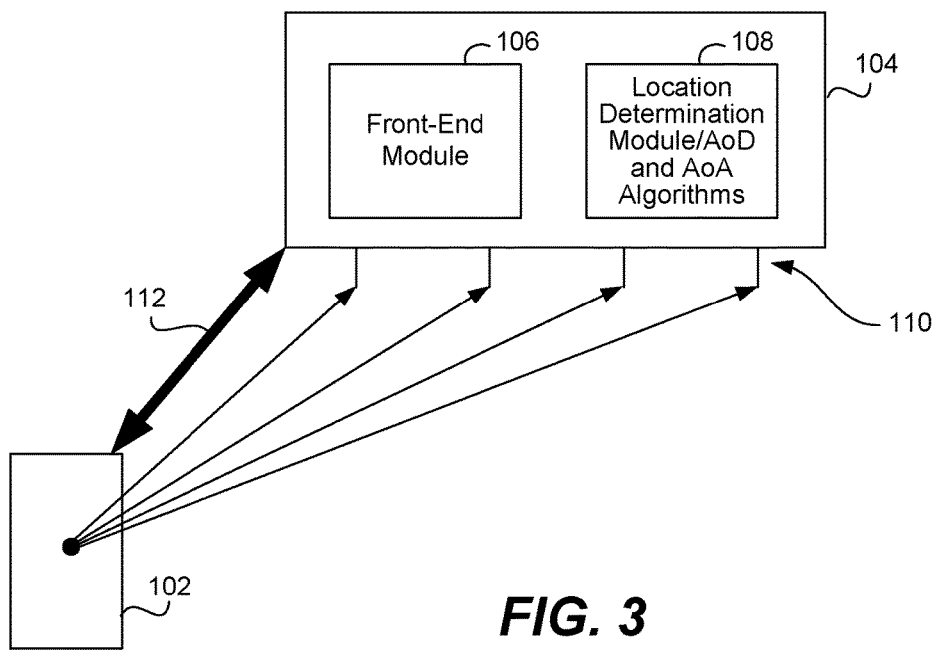
FIG. 3 is a block diagram of an embodiment in which a mobile device obtains its own location data from a multiple-antenna locator in accordance with one embodiment.

Configurations illustrating various embodiments are shown in FIGS. 1, 2, and 3. They describe the components, software modules and connections between them. FIGS. 4A, 4B, 5A, and 5B are flow diagrams that describe in detail processes that occur among the components in the various configurations.

FIG. 1 is a block diagram illustrating various devices and modules for enabling direction finding and asset location on a mobile device based on the Bluetooth specification in accordance with one embodiment. A mobile device 102 is used to obtain directions to and find a target asset 112. Device 102 may be a smartphone, smart wearable device, or other mobile computing device. In one embodiment, device 102 has Bluetooth technology that includes a profile for enabling and collecting phase measurements, together with location determination functions and Bluetooth low energy apps. In other embodiments, other wireless technologies, such as Wi-Fi or Zigbee, may be used. As described above, because of its limited form factor and other drawbacks, device 102 has limited antenna and RF capabilities. For example, it may have one or two antennas and due to the limited space inside typical mobile devices, the antenna designs may be compromised in terms of uniform directionality. Furthermore, as mobile devices are often handheld, the ability to place the antennas within the device in order to optimize location determination may be limited.

In a typical scenario, device 102 is held by a user who needs to locate an object; essentially to find something but does not know where that something is in the surrounding environment. The user can walk to find the object if provided with directions. For example, directions to asset 112 are visually displayed on the smartphone, such as an arrow pointing in the direction the user should walk. In one embodiment, directions may be communicated by audio, to the user. Asset 112 can be one of a wide range of objects. In one embodiment, it is a tag that is low cost, low energy consumption, and has limited antenna capability. It has at least one antenna that can transmit a signal, such as a radio frequency (RF) signal, as described below. In scenarios where asset 112 is a tag, the tag can be attached to or contained or embedded in the actual asset that is of interest to the user. As noted above, target asset 112 can be anything ranging from a sensor, monitor, machinery, home appliance, consumer electronic product, a vehicle, a physical location, and so on. However, in all cases, asset 112, minimally, is able to transmit a signal itself or through a proxy, such as a tag.

Mobile device 102 and asset 112 communicate with a third device referred to as multiple-antenna locator 104.

Locator 104 has strong RF capability via multiple antennas and is easily accessible by RF and wireless connectors and signals. In one embodiment, this device is in a fixed location and is free of any blockages or barriers; it is easily accessible from nearly any point in its environment. For example, it is accessible and within range of a signal transmitted by asset 112. In many cases, multiple-antenna locator 104 may be affixed to the ceiling or upper part of a wall in the region. The type of space may vary, for example, it may be a room, office, hallway, corridor, mall, a public space, such as an airport, building lobby, hospital, stores, and so on. Multiple-antenna locator 104 is aware of where it is; it has data that identifies its specific location in an environment. As noted, one feature it may have is an antenna array 110 which has multiple antennas that are not blocked and can detect and emit signals as needed efficiently. The number of antennas in array 110 may vary. In one example there are six antennas. In one embodiment, multiple-antenna locator 104 contains at least two functional modules that may execute software in conjunction with locator hardware components or may be solely software.

One is a front-end module 106 that is used to communicate and interface with remote devices, specifically with mobile device 102. In one example, module 106 provides a Generic Attribute Profile (GATT)-based service that supports Bluetooth services and provides one way of storing and accessing data over Bluetooth wireless links. A GATT server may also support access to a database storing data that can perform reads, writes, and other operations to interact with the database. In one embodiment, the GATT based service may be a vendor-specific service. This service enables mobile device 102 to use the location determination functions in a proxy manner. In one embodiment, front-end module 106 stores or has access to device 102 and asset 112 addresses, such as their respective Bluetooth addresses.

The other functional module in multiple-antenna locator 104 may be a location determination function module 108. This is a function that utilizes what are referred to as Angle of Departure (AoD) and Angle of Arrival (AoA) algorithms to enable direction finding and location of assets. As described in the flow diagram of FIG. 4, multiple-antenna locator 104 communicates with mobile device 102; specifically, it provides directional data for finding target asset 112. Asset 112 transmits a signal (via an internal antenna) that is detected by antennas in antenna array 110 of multiple-antenna locator 104. Collectively, front-end module 106 and location determination functions module 108 can be described as host stack software for locator 104.

FIG. 2 is a block diagram showing another different embodiment of enabling a mobile device to obtain directions to a target asset. The concept is similar to that described in FIG. 1 except multiple-antenna locator 104 is implemented as a network of individual locator devices, for example, devices 204, 212, and 214. These individual devices may be in the same general environment, surroundings or enclosure, and are able to detect a signal transmitted by asset 112. In one embodiment, the network may be a mesh network configuration or another suitable network implementation where the number of individual multiple-antenna locator devices can vary widely. A mesh network has wireless nodes capable of routing messages or data from node to node in order to deliver a message from one node in the network to another that is not within wireless range of the originating node. The network of locator devices, or a subset thereof, effectively operates or functions as one multiple-antenna locator apparatus to carry out the same objective as in FIG. 1, that is, to provide directions to mobile device 102 for locating target asset 112. In one embodiment, the mesh network may be a Bluetooth mesh network, a wireless network that includes network devices which communicate with each other using radio frequencies, protocols, standards, data formats, and the like, that have been defined by the Bluetooth Special Interest Group (SIG). In some embodiments, the Bluetooth mesh network (e.g., the devices within the Bluetooth mesh network) may use the Bluetooth Low Energy standard. Mobile device 102 and asset 112 are the same as those shown in FIG. 1. In this embodiment, asset 112 transmits one signal or tone. It is detected by some or all of the locator devices. In one embodiment, multiple-antenna locator devices 204, 212, 214 have front-end module 206 and location determination functions module 208. For ease of illustration, only one of the devices, device 204, is shown as having modules 206 and 208. Each device has an antenna array shown as arrays 210, 218, and 220. The antenna arrays do not have to have the same number of antennas and the functional modules on each do not have to be identical. Some may perform certain angle-data calculations differently, however, the end objective is to provide mobile device 102 with accurate directions for finding asset 112. The multiple-antenna locator devices 204, 212, 214 communicate with each other using an appropriate network protocol. Devices 204, 212, and 214 may represent a subset of nodes within a larger network and may be the devices which are within a suitable range of asset 112. One of the locator devices, for example, device 204, may communicate with mobile device 102 because it is the closest to mobile device 102. Mobile device 102 may communicate with locator 204 indirectly via mesh network communication, relayed by nodes other than devices 204, 212, and 214. In one embodiment, each, some, or all multiple-antenna locator devices may perform direction finding operations, determine directional data and transmit these data to the device 102 via the network to the device that communicates with mobile device 102. The communicating locator device may use the directional data it receives from other nodes to calculate more accurate or precise directional data that it will send to mobile device 102 using its front end module 206.

FIG. 3 is a block diagram of an embodiment in which a mobile device obtains its own location data from a multiple-antenna locator in accordance with one embodiment. In this self-locating embodiment, mobile device 102 requests information on its location in its current environment. For example, a user may be in a mall or airport and needs to know where she is. Device 102 transmits a signal to locator 104 which is detected by antenna array 110. Device 104 determines the location of mobile device 102 and transmits this data back to device 102 where it is displayed or otherwise communicated to the user. As shown in FIG. 2, multiple-antenna locator 104 may be a network of individual locator devices, some, each, or all of them having host stack software for direction finding based on angle-specific data, front-end services for communicating with remote devices, and an antenna array.

In embodiments where a multiple-antenna locator is implemented as a mesh network of locator devices, mobile device 102 creates and sends a request to the network for location data. Which specific multiple-antenna locator device in the network receives the request may be transparent to device 102. That is, it may not be relevant to device 102 which node in the network performs the direction finding calculations and communicates with it. It is likely that the multiple-antenna locator device or node that is closest to device 102 will perform the calculations after getting data from the other nodes. In another embodiment a subset of multiple-antenna locators that are within a suitable range of mobile device 102 collectively obtain location information and may combine the information to create a more accurate location estimation. In this manner the user may obtain more accurate or detailed location data than if the locator apparatus was not a network but only one multiple-antenna locator device.

There may be other variations in the configurations of the embodiments shown in FIGS. 1 to 3. As noted, the multiple-antenna locator apparatus may be a single node or a network of nodes, such as a mesh network of nodes. The antenna array may have varying number of antennas and may not be in a single unit, such as an array component. The objective is to obtain at least a few phase samples so that angle-data algorithms have adequate data to process and determine direction of the target asset.

Figure 4A:
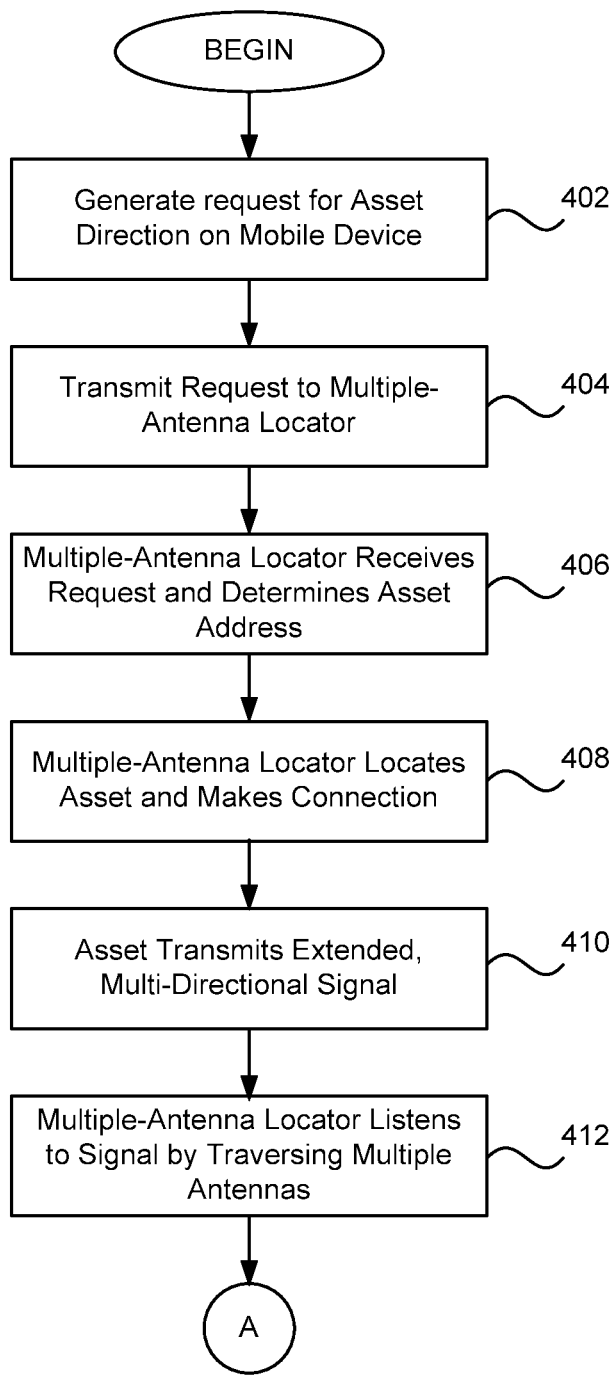
FIGS. 4A and 4B are flow diagrams showing processes of a mobile device obtaining directional data for locating a target asset using a multiple-antenna locator apparatus in accordance with one embodiment.
Figure 4B:
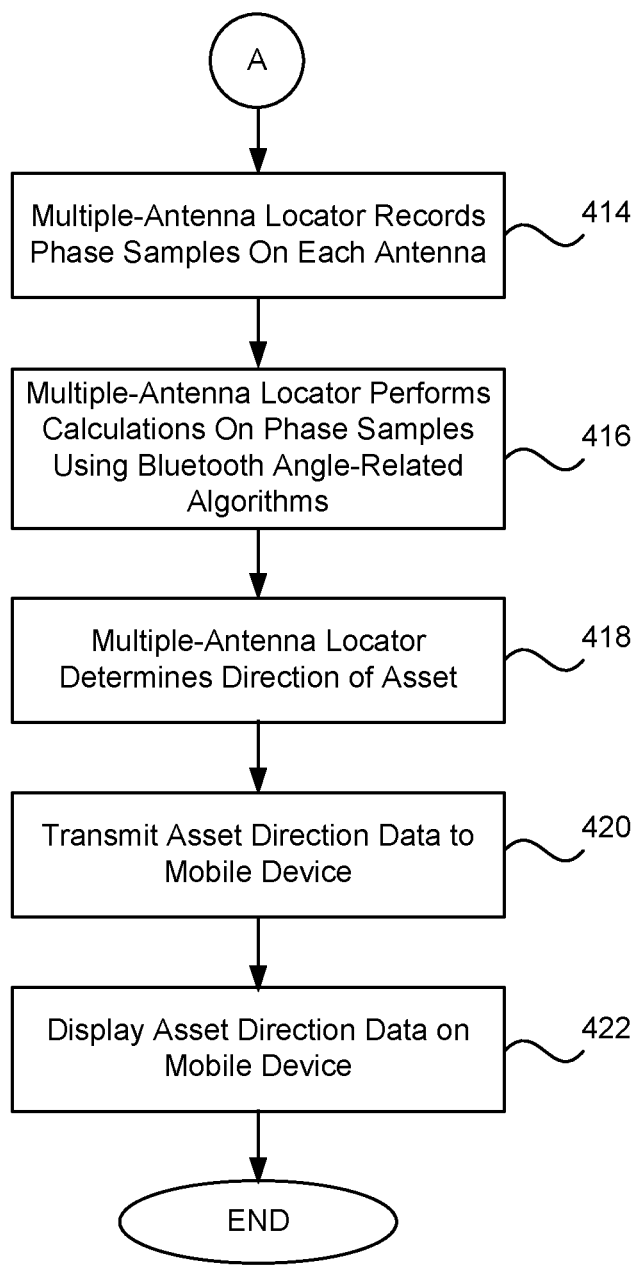

FIGS. 4A and 4B are flow diagrams showing processes of a mobile device obtaining directional data for locating a target asset using a multiple-antenna locator apparatus in accordance with one embodiment. It illustrates one connection-oriented method of finding the direction of a target asset using a locator apparatus (referring to a single device or a network of devices) which, as noted, has highly effective antenna and radio frequency characteristics. It also has the needed host stack software that not only allows it to do the needed direction finding calculations but can scale to process multiple requests (larger volumes) from many user requests concurrently.

As described above, a user needs to locate or find an object, device, or thing. Put simply, a user is looking for something in her general vicinity and wants to use her smartphone to get directions (e.g., a rotating arrow or a marker shown on a map) so that she can basically walk to the thing she is looking for. The user's phone is equipped with the necessary Bluetooth or other wireless services software that has direction finding features. These features may be native to the phone or enabled through an app that the user has downloaded.

In one embodiment, at step 402 the user initiates or opens an asset finding tool or app on her device with the objective of getting directions for locating a target asset. In other embodiments, the direction finding function may execute automatically by a machine, computer, device or via other means that do not require manual interaction. As noted above, the asset which emits the signals (to the multiple-antenna locator) may be a tag or similar low cost, low energy consumption object attached to, coupled to, or embedded or contained in the actual object that the user wants to find or the asset may be the actual object of interest. The user enters a description of the asset into the app or tool, such as a name or other identifier. This information is used on the mobile device to create a request for getting directions to the asset. In another embodiment, the user may request that a list of "locatable" or "findable" objects by that multiple-antenna locator be sent to her device. She can then select an asset from the list and the selection is used to create the request. These same operations may be requested by a machine, computer or device.

At step 404 in one embodiment, a direction finding app causes the device to transmit the request to the locator. In one embodiment, this transmission is done via Bluetooth wireless standards; however, other suitable wireless protocols or standards may be used to send the request to the multiple-antenna locator apparatus. For example, the device may search using Bluetooth low-energy tools, for nearby locators operating as beacons. As noted, the multiple-antenna locator apparatus is in a fixed location free of blockages so it can detect RF and other wireless signals. At step 406 a front-end interface of the locator receives the request. As noted, this front-end may be a GATT-based service or a vendor-specific service that allows the phone or device to access the location determination functions remotely via proxy. Once the request is received, an address for the target asset is determined, if not already known. In one example, this can be done by searching a table containing a mapping of assets with Bluetooth addresses.

At step 408 the multiple-antenna locator identifies the target asset. It may not know the exact location of the asset, only its identifier. It proceeds with making a connection via Bluetooth standard or other wireless protocols and standards. In another embodiment, the connection may be made via radio frequency.

At step 410 the asset has been notified or pinged and begins transmission of an extended signal that is emitted in all directions. In another embodiment, the signal may be emitted directionally, for example the signal may be aimed generally upwards and not downwards. The extended signal can be described as having two segments. A first segment is a normal or conventional signal that emits long enough so that the multiple-antenna locator antennas can detect or pick up on it. At step 412 the locator is now listening to the signal using one antenna in its array. The second segment of the signal is the extended portion. In other embodiments, the signal pattern to indicate that antenna rotation or traversal should begin may be implemented in other ways. Here the signal changes to a tone, such as a sine wave. When the antenna detects this change in the signal, the multiple-antenna locator rapidly traverses, rotates, or flips through all antennas in the array, each antenna detecting the tone. Using known techniques, a phase sample is recorded at each antenna and is stored in the multiple-antenna locator at step 414. In one embodiment, each antenna in the array listens to the tone for a short period, for example, a few microseconds.

At step 416 angle-data algorithms in, for example, the location determination functions module perform calculations using the phase sample data. In one embodiment, an angle of arrival algorithm is executed using the recorded phase samples as the raw data. In another embodiment, an angle of departure algorithm is used or a combination of both algorithms may be used. In other embodiments, different angle-related algorithms and calculations may be performed on the phase samples. These algorithms use the phase sample data to determine which direction the signal is coming from, thus determining which way the asset is in relation to the multiple-antenna locator. At step 418 the location determination functions determine the precise direction of the asset in a 3D vector space (i.e., in the surrounding environment). Before the process started, the locator could identify the asset (step 408) but did not know where it was physically in the surrounding space (and, more to the point, did not know which direction a user should walk to find it).

At step 420 the multiple-antenna locator uses directional data for the asset and its own location data to derive directional data that can be used by the mobile device. In one embodiment, the directional data is not modified before being transmitted to the mobile device. Generally, the mobile device requires a reference point to start with. In one embodiment, the mobile device obtains directions to the asset wherein the directions are relative to the mobile device itself. In another embodiment, the directions may be relative to the multiple-antenna locator apparatus. In some embodiments, the mobile device may display a 2D or 3D map to the asset, represented by a dot or other icon. The multiple-antenna locator may translate the directional data into a format that is more conducive to the display method suitable for the mobile device. In the embodiments where the multiple-antenna apparatus locates the mobile device and the target asset, as described below, the locator might perform the needed calculations (e.g., vector addition) so that the vector sent to the mobile device represents the direction from the mobile device to the target asset. In the various embodiments, the directional data is transmitted to the mobile device via the front-end module.

At step 422 the mobile device receives the directional data for finding the asset and displays it to the user. The interface for conveying this data may be implemented in a number of ways. For example, a simple arrow pointing in the direction of the asset may be displayed or a map or floor scheme may appear with a path showing how to walk to the asset may be displayed. In another embodiment, what may be referred to as "turn by turn" directions may be given to the user as the user travels to the asset. The multiple-antenna locator may continue to make periodic location estimates to update the position or directions as the user travels to the asset.

As described above, the locator may be a single device having one antenna array and host software or it may be a network of individual multiple-antenna locator devices, each having an antenna array and host software capable of performing the location determination functions (angle-related algorithms) and a front-end service for communicating with remote devices. The individual locator devices communicate data with each other and one is, or a few are, selected to communicate with the mobile device. Data gathered from the individual multiple-antenna locator devices, primarily directional data, may be transmitted to the locator device that communicates with the mobile device and the aggregate of that data may be processed to determine the most accurate direction data. In a simple example, the processing may be taking the average of all the directional data and providing that value to the mobile device. In one embodiment, the mobile device may be one component in the multiple-antenna locator mesh even though it does not have efficient antenna or RF capabilities.

Figure 5A:
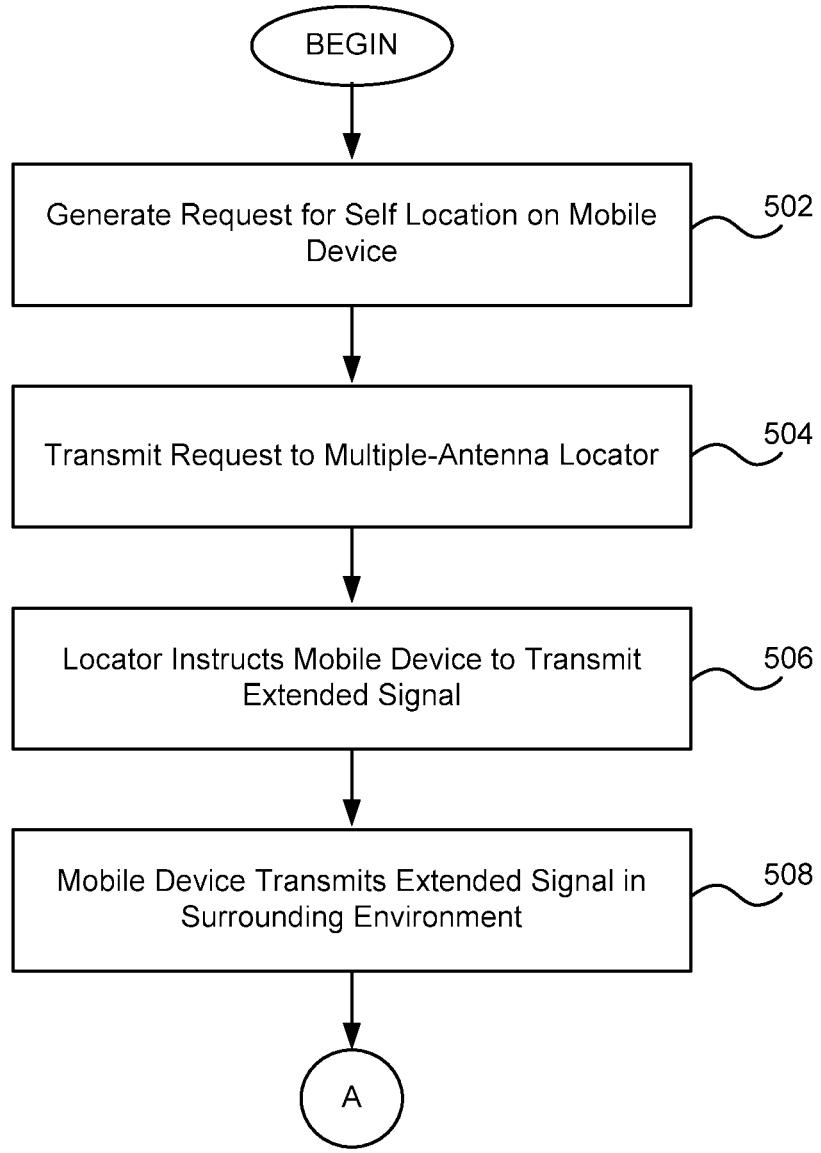
FIGS. 5A and 5B are flow diagrams showing a process of a mobile device obtaining its own location from a multiple-antenna locator apparatus in accordance with one embodiment.
Figure 5B:
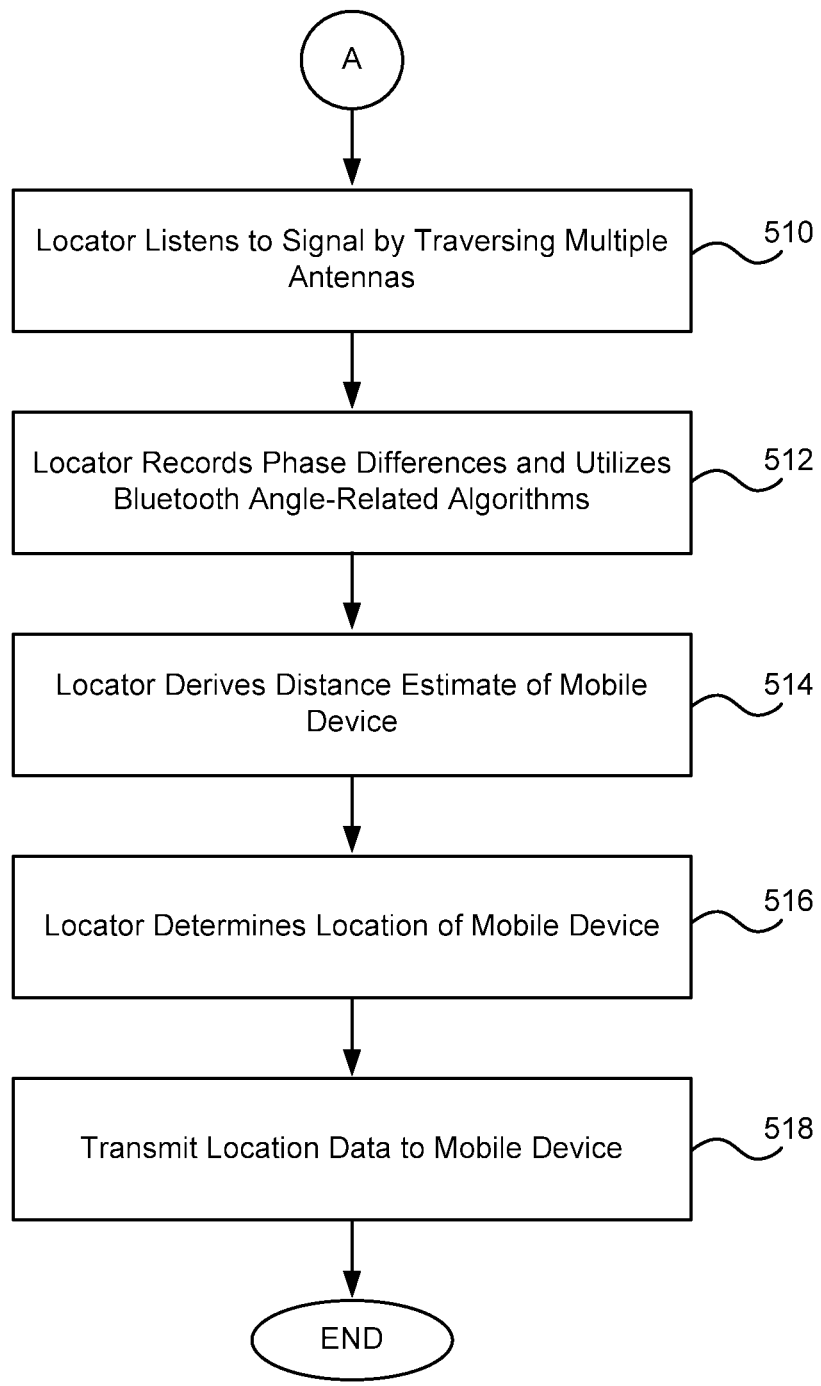

FIGS. 5A and 5B are a flow diagram of a process for a mobile device obtaining its own location data from the multiple-antenna locator apparatus in accordance with one embodiment. In this embodiment, the mobile device and locator apparatus have a connection, for example, a Wi-Fi or Zigbee connection, through which data can be transmitted. At step 502 the mobile device generates a request for its own location. This request can be created from a user application, another device, automatically by a program running on the device, or by other mechanisms or processes. The request is transmitted to a multiple antenna locator apparatus at step 504. This locator may be the one closest to the mobile device or one that already has a connection with the device and is in surrounding environment. At step 506 the multiple-antenna locator apparatus transmits instructions to the mobile device instructing it to begin transmitting an extended RF signal. In one embodiment, this can be referred to as extended transmission mode, instructing the mobile device to transmit a signal to the locator and extend the packets in this signal, similar to the signal transmission described at step 410 from the target asset to the locator apparatus.

At step 508 the mobile device transmits the extended RF signal using its internal antennas. In some embodiments, an antenna mechanism or device can be attached to the mobile device or coupled to it so that RF signals can in effect be sent from the same location as the mobile device. The signal is received by the multiple-antenna locator. At step 510 the locator listens for the RF signal using one antenna. It receives the signal with this antenna and when the signal pattern or packet pattern changes, the locator rotates through the other antennas in its antenna array. Phase sample data is recorded at each antenna, again similar to the functions performed at steps 414 and 416 above. At step 512 the locator records the phase samples and utilizes angle-related algorithms, such as AoA or AoD algorithms as described above.

In this manner, the locator determines the direction of the mobile device relative to itself. As described below, this direction data or vector is one component used by the locator or mobile device to calculate or estimate the location of the mobile device. At step 514 the locator derives a distance estimate between the locator and the mobile device. In one embodiment, the locator can use Received Signal Strength Indicator (RSSI) measurements to derive the distance of the mobile device. In another embodiment, it may use Time of Flight (TOF) methods to determine the distance. At step 516 the locator determines the location of the mobile device in the surrounding environment or space. In one embodiment, the locator uses the directional data of the mobile device, an estimated distance to the mobile device, and the locator's own location data. These data items are used by the locator to determine the location of the mobile device in the surrounding environment. At step 518 the locator transmits the location data to the mobile device and the process is complete.

In another embodiment the mobile device obtains not only the direction to the target asset but also the distance or range to the asset. This information can be derived by the mobile device using information from the multiple-antenna locator. Specifically, two location vectors can be combined or added by the multiple-antenna locator or by the mobile device to obtain a distance from the mobile device to the asset. In one embodiment, the locator apparatus calculates the distance from itself to the target asset. For example, it can use its own location data and data it has of the direction to the target asset relative to itself to calculate the distance between it and the asset. It can also use RSSI or Time of Flight calculations, as described above, since it is receiving RF signals from the asset. More specifically, the multiple-antenna locator derives a location vector for the target asset; it knows that the target asset is a certain distance away and is in a certain direction, wherein these two data components make up the first location vector.

A second location vector is derived in a similar manner but from the perspective of the mobile device. The multiple-antenna locator apparatus has data on the direction of the mobile device and the distance of the mobile device from the locator. As such, the locator has a location vector with respect to the mobile device; it knows the direction of the mobile device and the distance. In one embodiment, these two location vectors are added to derive the distance between the mobile device and the target asset. The location vector addition may be performed on the multiple-antenna locator and the result, the distance between the mobile device and the asset, is transmitted to the mobile device. In another embodiment, data for the two vectors are transmitted to the mobile device and the device performs the vector addition to derive a distance to the target asset.

The role and functionality of the mobile device may vary in the embodiments described above and in the figures. As noted, the mobile device itself has one or more antennas. The effectiveness of these antennas and the RF functionality of the device overall may vary. In some cases the blockages, such as from a user's hand, and the form factor of the device may not be present or necessarily be an impediment to the mobile device's antenna functionality. As such, in some embodiments the mobile device may be used as a node in a Bluetooth mesh network or other type of network as those described above. The mobile device itself may have a front-end module or a module that has similar functionality. It may also have the Bluetooth and BLE applications, and AoA and AoD algorithms. This may enable it to function as a locator but, in one embodiment, without the full-scale functionality of a multiple-antenna array. For example, the multiple-antenna locator apparatus may record and store the phase sample data. These data may be transmitted to the mobile device and the mobile device performs the direction finding calculations using Bluetooth, AoA, AoD, or other angle-related calculations. In this manner, the direction of the target asset is calculated on the mobile device.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method of obtaining directional data for locating a target asset, comprising:
   generating, in response to a command from a requesting device, a request for directional data relating to the target asset;
   transmitting the request to a multiple-antenna locator apparatus for directional data relating to the target asset wherein the multiple-antenna locator apparatus identifies the target asset and determines a distance estimate between the multiple-antenna locator apparatus and the target asset;
   detecting a signal from the target asset at a first antenna on the multiple-antenna locator apparatus, the signal having a first segment and a second segment that has different characteristics from the first segment;
   recording a phase sample on each antenna by traversing a plurality of antennas, thereby obtaining a plurality of phase samples;
   calculating the direction of the target asset utilizing the plurality of phase samples and Bluetooth angle-specific calculations, thereby calculating directional data of the target asset; and
   receiving the directional data thereby facilitating locating the target asset.

2. A method as recited in claim 1 further comprising:
   estimating a location vector of the target asset on the requesting device, utilizing a position data of the multiple-antenna locator apparatus and the directional data.

3. A method as recited in claim 1 wherein the multiple-antenna locator apparatus is a network of single multiple-antenna locator devices.

4. A method as recited in claim 3, wherein the network of multiple-antenna locator devices is a Bluetooth Low Energy (BLE) mesh network.

5. A method as recited in claim 1 wherein the multiple-antenna locator apparatus executes host stack software utilizing Bluetooth angle-specific calculations.

6. A method as recited in claim 5 wherein the Bluetooth angle-specific calculations include angle of departure and angle of arrival algorithms.

7. A method as recited in claim 2 wherein the requesting device calculates a distance estimate to the target asset using the location vector of the target asset and a requesting device location vector.

8. A method as recited in claim 1 wherein the multiple-antenna locator apparatus determines a distance estimate between the multiple-antenna locator apparatus and the target asset.

9. A method as recited in claim 8 further comprising:
   obtaining a distance estimate between the requesting device and the multiple-antenna locator apparatus wherein the multiple-antenna locator apparatus determines the distance estimate between the requesting object and the multiple-antenna locator apparatus.

10. A method as recited in claim 9 wherein the multiple-antenna locator apparatus calculates an estimated location of the target asset relative to the requesting device utilizing vector addition and transmitting the estimated location to the requesting device.

11. A method of determining a location of a requesting device comprising:
    transmitting to a multiple-antenna locator apparatus a request for providing location data of the requesting device;
    detecting a signal from the requesting device at a first antenna on the multiple-antenna locator apparatus, the signal having a first segment and a second segment that has different characteristics from the first segment;
    recording a phase sample on each antenna by rotating through multiple antennas, thereby obtaining a plurality of phase samples;
    calculating the direction of the requesting device utilizing the plurality of phase samples and Bluetooth angle-specific calculations, thereby calculating a location of the requesting device relative to the locator apparatus; and
    receiving location data from the multiple-antenna locator apparatus.

12. A method as recited in claim 11 wherein the multiple-antenna locator apparatus is a plurality of multiple-antenna locator devices.

13. A method as recited in claim 12 wherein the plurality of multiple-antenna locator devices includes a Bluetooth Low Energy (BLE) mesh network.

14. A method as recited in claim 12 wherein the multiple-antenna locator device has a plurality of antennas and host stack software that processes Bluetooth angular data.

15. A system comprising:
    a mobile device having an asset location determination tool and configured to convey directions to a target asset;
    a multiple-antenna locator apparatus having multiple antennas for detecting an extended radio frequency (RF) signal from a target asset and a location determination module configured to record and store phase sample data and execute Bluetooth angle-data calculations using the phase sample data wherein the multiple-antenna locator apparatus receives a request for location data or directional data from the mobile device and transmits data to the mobile device; and
    the target asset configured to transmit the extended RF signal to the multiple-antenna locator apparatus and receive an initial signal from the multiple-antenna locator apparatus;
    wherein the multiple-antenna locator apparatus receives the extended RF signal and determines the directions to the mobile device.

16. A system as recited in claim 15 wherein the multiple-antenna locator apparatus includes a front-end module configured to transmit the direction of the target asset to the mobile device and receive a request for directional data from the mobile device.

17. A system as recited in claim 15 wherein the multiple-antenna locator apparatus is one of a single multiple-antenna locator device or a Bluetooth Low Energy mesh network of multiple-antenna locator devices.

18. A system as recited in claim 15 wherein the Bluetooth angle-data calculations include one of an angle of arrival function, an angle of departure function, or a combination of angle of arrival function and angle of departure function.

\* \* \* \* \*